UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF MAKING ACETYL-CELLULOSE PLASTIC COMPOUNDS.

1,226,343. Specification of Letters Patent. Patented May 15, 1917.

No Drawing. Original application filed May 23, 1912, Serial No. 699,237. Divided and this application filed July 10, 1915. Serial No. 39,192.

*To all whom it may concern:*

Be it known that I, WILLIAM G. LINDSAY, a citizen of the United States, residing at Caldwell, in the county of Essex and State of New Jersey, have invented certain new and useful Improvements in Processes of Making Acetyl-Cellulose Plastic Compounds, of which the following is a specification.

The various compositions to which the present invention relates are employed in the arts, sometimes as imitations of natural substances, and sometimes as films which are used for photographic purposes, whether as the base upon which the sensitive coating is superimposed or as a component part of the film with which the sensitized substance has been partially incorporated in the sensitization. Although the final or useful form of the different compounds of acetyl cellulose is that of a solid or dry material, the different processes of conversion into this final solid form involve, as is well understood, the employment of solutions and mixtures of varying consistencies as to elasticity, stiffness or fluidity, depending generally upon the proportion or kind of solvent used to the amount of the original base—acetyl cellulose, this being a division from my application Serial No. 699,237 filed May 23, 1912.

In the treatment of acetyl cellulose for the production of solutions for the manufacture of lacquers, varnishes, photographic films, and flexible or plastic compounds, I have discovered that while it is well known that epichlorhydrin is a solvent for acetyl cellulose and that the variety which is freely soluble in acetone dissolves freely in this liquid, there are certain objections to its use in the manufacture of acetyl cellulose plastic compounds due mainly to the rather high boiling point and the peculiar action of this solvent under manipulation.

I have found, however, that epichlorhydrin not only does not lose in its solvent action upon dilution with either ethyl or methyl alcohol but that such dilution or admixture results in a volatile product having increased solvent action and possessing certain characteristics of great value in the manufacture of acetyl cellulose plastic compounds.

One example of carrying out my invention is as follows:

I add to 100 parts of acetyl cellulose of the variety described from 20 to 50 parts of paraethyltoluolsulfonamid and from 10 to 30 parts of triphenylphosphate and make a mechanical mixture by stirring. I then add to this mass 70 parts, by weight, of a mixture composed of equal volumes of epichlorhydrin and either methyl alcohol or ethyl alcohol or a mixture of the two alcohols. The mass thus produced is made into a uniform mixture by means of a malaxator or other suitable mixing device, and after thorough mixing the excess of solvent is allowed to evaporate, preferably during further mixing, and the dough-like mass thus produced is then further worked up according to the well-known method of manufacturing nitro-cellulose-camphor compounds.

I have also found that the combination of epichlorhydrin and methyl alcohol is also useful in preparing lacquers, varnishes, and films from acetyl cellulose of the variety described. In this case the quantity of volatile solvents in proportion to the acetyl cellulose is increased so as to make a more fluid mixture, and then upon spreading the solution upon a smooth surface such as glass and allowing the volatile solvent to evaporate there is left a resultant film which is useful for photographic purposes. In the case of a varnish or lacquer the solution would be spread upon the substance to which it is to be applied and the volatile solvent allowed to evaporate therefrom.

It was not possible to foretell from the chemical properties of epichlorhydrin what action these substances would have in admixture, but I have found them to be as stated above, and the operator will understand that I have described new solvents which will be of use to him in the particular case in which they are adapted for his purpose.

By paraethyltoluolsulfonamid, I mean the compound having the following structural formula:—

the same being an alkylated aromatic sulfonamid.

Having thus described my invention, what I claim is:

1. The process of making plastic compounds from that variety of acetyl cellulose which is freely soluble in acetone that consists in mixing acetyl cellulose which is freely soluble in acetone with paraethyltoluolsulfonamid; adding to this mixture a solvent composed of equal volumes of epichlorhydrin and a monohydric alcohol having not more than two carbon atoms, substantially as set forth.

2. The process of making plastic compounds from that variety of acetyl cellulose which is freely soluble in acetone that consists in mixing acetyl cellulose which is freely soluble in acetone with paraethyltoluolsulfonamid; adding to this mixture a solvent composed of equal volumes of epichlorhydrin and methyl alcohol, substantially as set forth.

3. The process of making plastic compounds from that variety of acetyl cellulose which is freely soluble in acetone that consists in mixing acetyl cellulose which is freely soluble in acetone with paraethyltoluolsulfonamid and triphenylphosphate; adding to this mixture a solvent composed of equal volumes of epichlorhydrin and a monohydric alcohol having not more than two carbon atoms, substantially as set forth.

4. The process of making plastic compounds from that variety of acetyl cellulose which is freely soluble in acetone that consists in mixing acetyl cellulose which is freely soluble in acetone with paraethyltoluolsulfonamid and triphenylphosphate; adding to this mixture a solvent composed of equal volumes of epichlorhydrin and methyl alcohol, substantially as set forth.

5. The process of making plastic compounds from that variety of acetyl cellulose which is freely soluble in acetone that consists in mixing acetyl cellulose which is freely soluble in acetone with an alkylated aromatic sulfonamid; adding to this mixture epichlorhydrin and at least one of the following alcohols:—ethyl alcohol, methyl alcohol, substantially as set forth.

6. The process of making plastic compounds from that variety of acetyl cellulose which is freely soluble in acetone that consists in mixing acetyl cellulose which is freely soluble in acetone with an alkylated aromatic sulfonamid; adding to this mixture epichlorhydrin and methyl alcohol, substantially as set forth.

7. The process of making plastic compounds from that variety of acetyl cellulose which is freely soluble in acetone that consists in mixing acetyl cellulose which is freely soluble in acetone with an alkylated aromatic sulfonamid and triphenylphosphate; adding to this mixture epichlorhydrin and at least one of the following alcohols:—ethyl alcohol, methyl alcohol, substantially as set forth.

8. The process of making plastic compounds from that variety of acetyl cellulose which is freely soluble in acetone that consists in mixing acetyl cellulose which is freely soluble in acetone with an alkylated aromatic sulfonamid and triphenylphosphate; adding to this mixture epichlorhydrin and methyl alcohol, substantially as set forth.

In testimony whereof I affix my signature.

WILLIAM G. LINDSAY.